Nov. 26, 1968   D. J. HARRIS   3,412,974
FLUID CONTROLLING VALVES

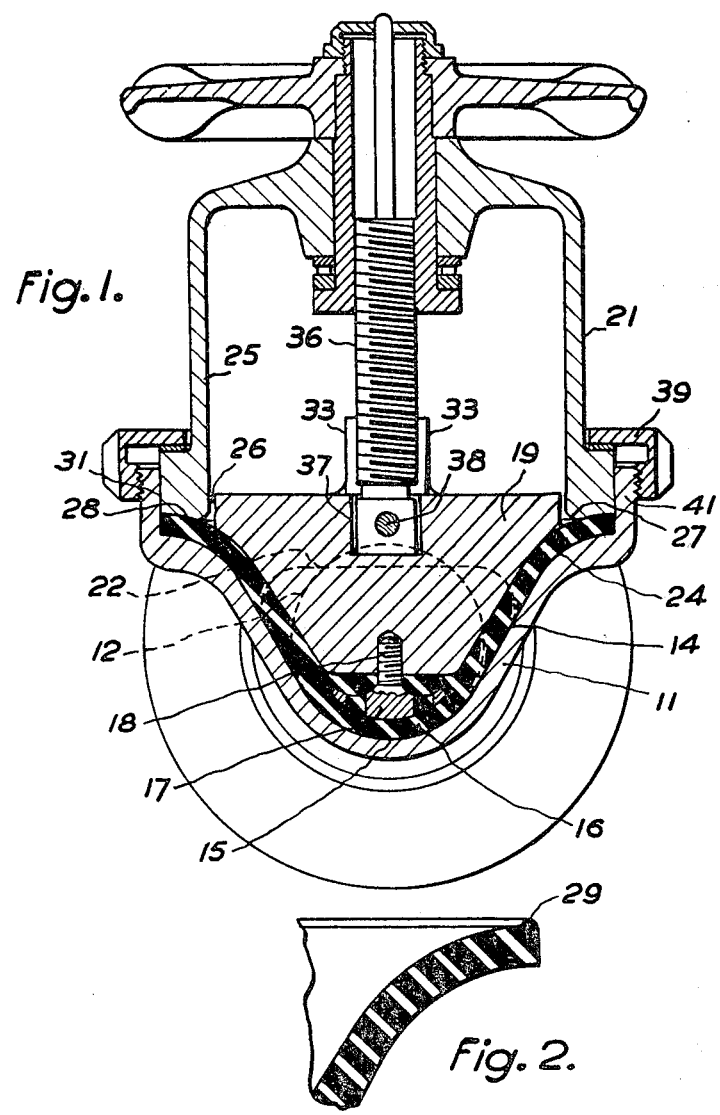

Filed Aug. 16, 1965   3 Sheets-Sheet 2

Inventor
Derek John Harris
By
Watson, Cole, Grindle & Watson
Attys.

United States Patent Office 3,412,974
Patented Nov. 26, 1968

3,412,974
FLUID CONTROLLING VALVES
Derek John Harris, Cwmbran, England, assignor to Saunders Valve Company Limited, Cwmbran, England, a British company
Filed Aug. 16, 1965, Ser. No. 479,896
Claims priority, application Great Britain, Aug. 20, 1964, 34,131/64
9 Claims. (Cl. 251—331)

ABSTRACT OF THE DISCLOSURE

A diaphragm valve of the straight through bore type having the seating formed partly by a tapering opening from one side which runs tangentially into the bore at the sides, and completed by the bore, has the seating rounded over by a large radius curvature running into the clamping surface, also curved, on the valve casing for the margin of the diaphragm, while the compressor follows the rounded curvature, and reaches to within working clearance of the clamping surface of the valve bonnet. The effect is to obtain tight closure of the valve without the need to allow for stretching of the diaphragm, while the clamped width of the diaphragm margin can be made narrower than in prior art valves. The diaphragm margin may have a peripheral rib which is compressed by the clamping surface on the bonnet. The casing may have a cylindrical wall which bounds the peripheral edge of the diaphragm, formed in a part externally threaded to receive a ring nut by which the bonnet is held to the casing.

This invention relates to fluid controlling valves of the kind having a substantially straight through bore and a seating formed in part by an opening extending from one side of the valve casing, of generally tapering form running tagentially into the valve bore as seen in transverse section, and completed by the bore, the closure member being a diaphragm of shape corresponding to the seating. A valve of the kind in question is disclosed in U.S. Patent No. Re. 24350.

In such a valve if the diaphragm is to isolate the mechanism from the controlled fluid, the margin of the diaphragm must be clamped to the valve casing, for which purpose it is most convenient to provide the casing and bonnet with flat clamping surfaces. Also, in order to avoid damaging the material of the diaphragm, it is necessary to round off the junction between the clamping surface of the casing and the seating. Owing to the generally tapered form of the diaphragm and the compressor which presses it against the seating when the valve in closed, in practical constructions of valves of the kind in question, it has hitherto been impossible to provide the compressor with a contour which following on over the rounded junction, If such a contour were provided, it could only be relied on to come into action if the manufacturing tolerances were made far smaller than would be economic. If this part of the compressor and the rest of the valve were not made within such narrow tolerances, then there would be the risk either that the conical part of the diaphragm would be firmly pressed against the seating before any adequate pressure came on the rounded junction or the rounded junction might come under excessive pressure before the greater part of the diaphragm was under adequate pressure. The latter condition would lead to rapid destruction of the diaphragm and must, therefore, be avoided, in other words, the commercial tolerances must be such that this condition cannot raise. Under such conditions a rounded contour on the compressor is useless and it has been the practice to omit it.

As a result there is no direct pressure on the diaphragm in the region of the rounded junction when the valve is closed and the greatest tendency to leakage is in this region.

Various proposals have been made to deal with this problem but until recently the practical way of dealing with the problem has been to dimension the diaphragm so that though moulded in a form corresponding to the closed position of the valve, its axial length is a little short so that when the valve is under axial tension and this tension has been relied on to hold the diaphragm sufficiently tightly over the rounded junction to obtain tight closure without the necessity for imposing excessive pressure on the part of the diaphragm against which the compressor actually bears.

Another practical probelm which valves of the kind in question have presented to ensure that the part of the diaphragm which is just within the clamped margin corrugates outwardly when the valve is opened and to make the valve easier to open against the resistance of the diaphragm to being turn inside out which is what opening does, and this problem has been solved by giving the marginal part of the diaphragm a contour which continues the slope of the side of the diaphragm through less steeply, so that before clamping the margin of the diaphragm is not flat. This diaphragm is disclosed in U.S. Patent No. 2,840,339. While this ensures the proper form of the corrugation and also makes it easier to open the valve, it has only aggravated the problem of getting a tight closure in the region of the rounded junction between the seating and the clamping surface of the valve casing.

The present invention deals with these problems in a different manner.

While the general form of the seating and diaphragm are similar to those in the prior constructions, the diaphragm is shaped so that there is substantially no stretching when the valve is closed but the seating is rounded over in a continuous curve into and with the clamping surface on the casing with a large radius, while the compressor at least at the sides is made of contour to match so that its contour extends over the rounded over part of the seating and reaches as closely as practical to the surface which clamps the margin of the diaphragm to the valve casing. By large radius is meant having a radius not less than half the radius of the base of the cone constituted by the tapering side of the opening assuming that the cone continued to the plane of the clamping surface on the valve casing. The radius could be increased until it reaches a value at which the straight side of the cone is virtually eliminated. Because the diaphragm is not substantialy stretched when closed, there are no substantial inward radial forces in its margin to be resisted and the clamping surface on the bonnet can be made narrower than in the prior art valves. Due to the minimum clearance between the compressor and the bonnet the clamping surface which clamps the margin of the diaphragm to the casing, when the valve is closed there is only a very narrow zone of the diaphragm, equal to the width of this clearance plus the effect of rounding off the corner between the clamping surface and the wall of the bonnet on which this clamping surface is formed, which is not under direct pressure.

The invention will be further described with reference to two examples illustrated in the accompanying drawings.

FIGURE 1 is a transverse section of the first example with the valve closed.

FIGURE 2 is a detail cross-section on a somewhat enlarged scale of the margin of the diaphragm used in the valve of FIG. 1.

Figure 3:
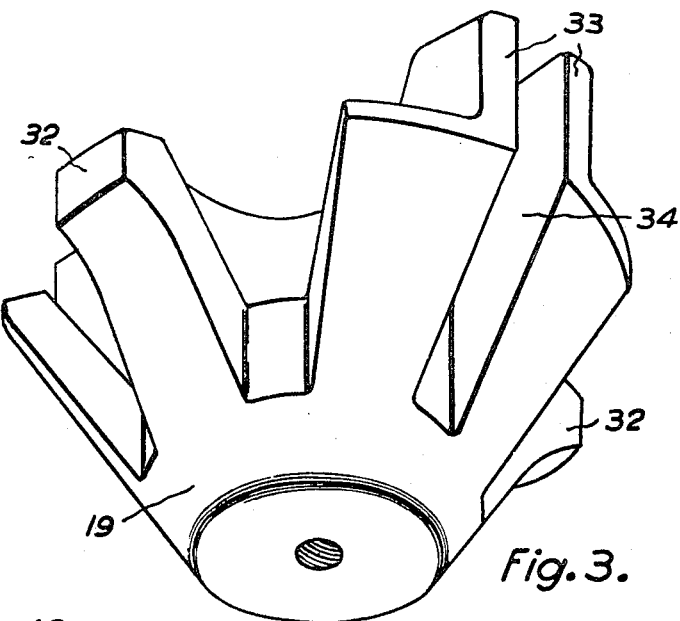
FIGURE 3 is a perspective view from below on a larger scale of the compressor used in the valve of FIG. 1.
Figure 5:
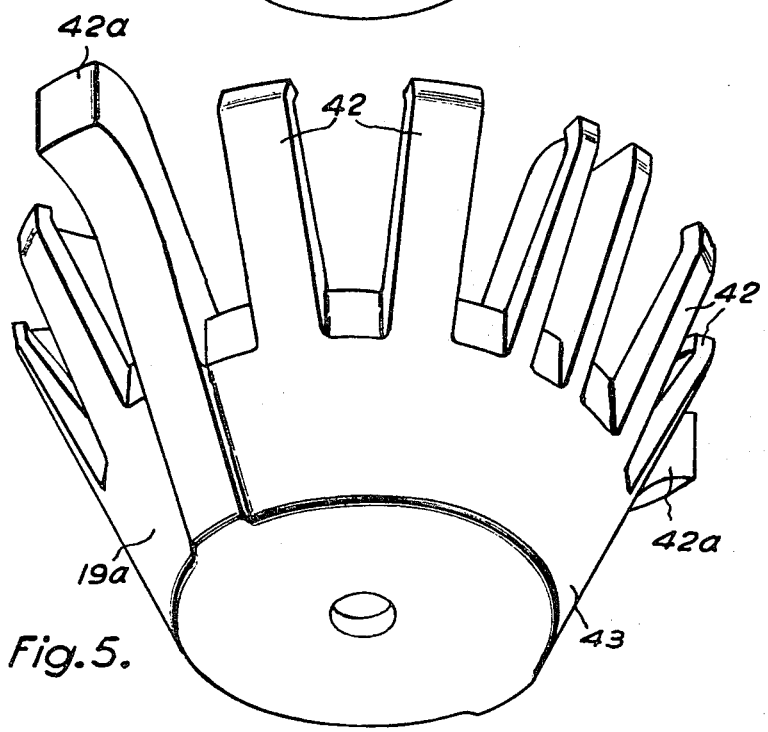
FIGURE 5 is a perspective view from below on a somewhat enlarged scale of a compressor used in the valve of FIG. 4.
Figure 4:
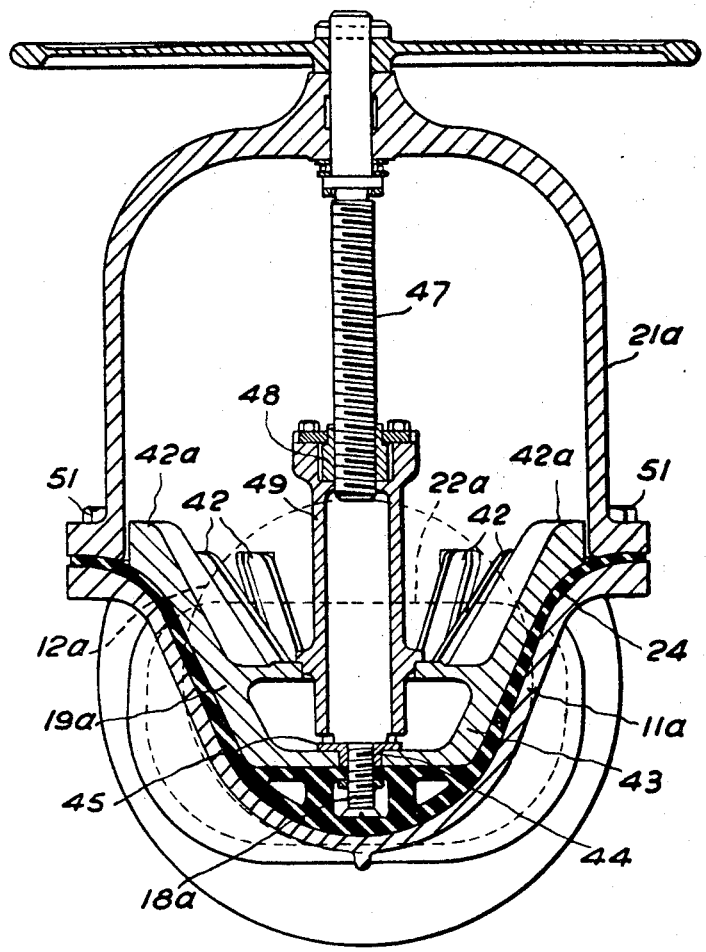
FIGURE 4 is a transverse section of the second example with the valve closed.

The construction of valve shown in FIGURES 1 to 3 is appropriate for valves of relatively small bore, say 3 inches (75 mm.) while that shown in FIGURES 4 and 5 is appropriate for valves of relatively large bore say 14 inches (350 mm.) and it will be understood that FIGURES 1 to 3 are on a larger scale than FIGURE 4.

Referring now to FIGURES 1 to 3 the valve comprises a casing 11 having a substantially straight through bore and a seating formed in part by an opening 14 extending from one side of the valve casing, of generally tapering form running tangentially with the valve bore as seen in transverse section in FIGURE 1, the seating being completed by the lower portion 15 of the bore. The closure member is a diaphragm moulded in a shape corresponding to the closed position of the valve, the central portion or nose 16 being solid with the head 17 embedded therein of a stud 18 by which the centre of the diaphragm is attached to a compressor 19 though the valve is opened as well as closed. So far the valve is on the general lines disclosed in Patent No. 3,157,383, issued Nov. 17, 1964, with two main exceptions.

First between the ends of the casing 11 where the bore is circular as at 12 in cross section as at 21 and the centre as in valves which have been in commercial production for some years, the upper part of the cross section of the bore is wider and lower in height than part of a circle as by this measure the overall height can be reduced without substantial reduction or sudden changes in cross section and this in turn enables a somewhat smaller diameter of the mouth of the opening 14 to be used with consequent reduction in the size of a bonnet 21 which contains the compressor 19 and the operating mechanism to be described. The ports formed where the bore meets the opening 14 are marked 22 and illustrate the change in cross section of the bore.

Second, and the invention is embodied in this exception, instead of the part of the seating constituted by the tapering opening 14 continuing straight sided almost to its mouth and there having a small rounded off junction with the flat surface against which the margin of the diaphragm is clamped by the bonnet 21, this part of the seating is rounded over into the clamping surface with a large radius portion 24 which as will be seen barely reaches a direction perpendicular to the axis of the diaphragm at its extreme diameter. The compressor 19 in its turn has its surface which engages the diaphragm carried well over the rounded junction 24 almost to the wall 25 of the bonnet 23, only working clearance 26 being left. Due to this small clearance 26 when the valve is closed there is only a very narrow zone of the diaphragm, equal to the width of the clearance 26 plus the effect of rounding off the corner as at 27 between the clamping surface 28 of the bonnet and its wall 25 (necessary to avoid damaging the diaphragm when the valve is opened), which is is not under direct pressure.

The diaphragm is moulded in such form that it is not stretched substantially when the valve is closed but manufacturing tolerances are arranged so that the diaphragm will never be bigger than necessary to fit the valve casing when the valve is closed and may be slightly smaller so that to this extent there is slight stretch.

To give an idea of the tolerance, it may be mentioned that where in a prior art valve for a pipe of 3 inch (75 mm.) an axial stretch of 9/32 inch (7 mm.) would be allowed, in the present valve the margin for stretch would be from 0 to 3/32 inch (2½ mm.). Because the diaphragm is not substantially stretched when closed, there are no substantial inward radial forces in its margin to be resisted and the clamping surface 28 can be made narrower than in the prior art valves. Better to ensure a good seal and resist such inward forces as there may be, the diaphragm may be provided with a peripheral rib, suitably on the surface which faces the bonnet, as at 29, FIGURE 2, the rib being pressed flat by the clamping surface 28, while the casing may have a cylindrical wall 31 which bounds the peripheral edge of the diaphragm.

As a result of the incorporation of the invention, while the cross section of the taper seating and the bottom of the bore may be substantially the same as in the prior art valve, the outside diameter of the diaphragm can be made a little less and the extreme diameter of the compressor about the same. For a 3 inch (75 mm.) bore valve, the radius of the part 24 may be about 1 11/32 inches (35 mm.), and with a cone angle of the seating in the valve casing of about 60°, the portion over which the compressor extends may be an arc of about 28°.

Although the diaphragm and clamping surfaces are symmetrical around the axis of the diaphragm, it is not necessary that the curved extension of the compressor should extend all round. It is enough that it should extend on opposite sides over a reasonable width. Thus for a valve for a 3 inch (75 mm.) pipe the compressor as shown in FIGURE 3 may be divided into wide fingers, extending from the central part which engages the diaphragm in the inside of the nose those 32 with the curved extension being parallel and say ⅞ inch (26 mm.) wide. The others 33 may constitute outwardly diverging double fingers disposed with a plane of symmetry perpendicular to that of the extended finger, the double fingers having an angular width of about 60° with a slot 34 separating the two fingers in each to clear one of the usual webs in the bonnet which serve to support the diaphragm in the open position and to prevent the compressor from rotating in relation to the bonnet. The double fingers 33 are of simple conical contour, matching the conical part of the extended fingers 32.

Since the curved extensions of the extended fingers 32 are relied on to press the diaphragm into sealing contact in the rounded over zones, to allow for inaccuracies in manufacturing the compressor is preferably pivoted to the operating mechanism on an axis transverse to the curved extensions, i.e. an axis parallel to the valve bore. In the illustrated example the mechanism comprises a rising spindle 36, the end of the spindle being a clearance fit in a recess 37 in the compressor 19 and be pivoted to it by a cross pin 38 access to which is through the above mentioned slots.

In the example shown in FIGURES 1 to 3 the bonnet 21 is held to the casing by a ring nut 39 instead of the clamping bolts which are usually employed in valves of this kind. Such a ring nut enables the valve to be quickly disassembled as may be desirable where frequent sterilisation is necessary. The narrower clamping surface on the bonnet and smaller diameter of the diaphragm than in the prior art valve enables the ring nut to be smaller than it would be with the prior art valve and the wall 31 on the casing bounding the edge of the diaphragm also fits in with this construction, being the inner wall of the threaded part 41 of the casing on to which the ring nut 39 screws.

The larger bore valve shown in FIGURE 4 is in many ways similar to that of FIGURES 1 to 3 and those parts which are similar have been given the same references and do not need to be described afresh.

The main differences are in the internal shape of the casing 11a and of the compressor 19a.

As regards the casing, the reduction in height between the ends and the seating is somewhat greater and the departure of the cross section from a circle is somewhat greater, being indicated by the dotted line 22a.

As regards the compressor 17a it is made of more elaborate form to save weight, being divided into twelve fingers 42 while the lower part 43 is hollow. The fingers 42a with the curved extensions stand somewhat proud of the part 43. The attachment to the stud 18a is by a loose nut 44 with arms 45 which prevent rotation of the nut which allows axial lost movement, the parts being proportioned so that when the valve is closed the pressure on the nose of the diaphragm is through the compressor but not on the stud. This lost motion arrangement is itself the subject of U.S. Patent No. 3,298,660. The compressor in this example is moved by a non-rising screw spindle 47 engaging a nut 48 loosely but non-rotatably carried by the compressor at the upper end of a hollow stem 49. The bonnet 21a is held to the casing 11a by a row of bolts 51 which traverse holes in the clamped margin of the diaphragm.

What is claimed is:

1. A fluid controlling valve of the kind having a substantially straight through bore and a seating formed in part by an opening extending from one side of the valve casing of generally tapering form of smooth contour running tangentially into the valve bore as seen in transverse section, and completed by the bore, the closure member being a diaphragm of shape corresponding to the seating and clamped at its margin to the valve casing the closure member being pressed against the seating by a compressor when the valve is closed, in which the diaphragm is shaped so that there is substantially no stretching of it when the valve is closed but the seating is rounded over in a continuous curve into and with the clamping surface on the casing with a surface of large radius in axial section, while the compressor at least at the sides is made of a contour to match, so that its contour extends over the rounded over part of the seating and reaches so closely to a surface which follows the curvature of the diaphragm and clamps the margin of the diaphragm to the valve casing as to leave only working clearance between the compressor and the inner periphery of said last-mentioned surface.

2. A fluid controlling valve according to claim 1 in which the surface of the valve casing against which the margin of the diaphragm is clamped is curved throughout in axial section and barely reaches a direction perpendicular to the axis of the diaphragm at its extreme diameter.

3. A fluid controlling valve according to claim 2 in which the diaphragm has a peripheral rib which is pressed flat by the surfaces which clamp the margin of the diaphragm.

4. A fluid controlling valve according to claim 3 in which the rib is on the surface which faces the surface which clamps the margin of the diaphragm to the valve casing.

5. A fluid controlling valve according to claim 1 in which the valve casing has a cylindrical wall which bounds the peripheral edge of the diaphragm.

6. A fluid controlling valve according to claim 1 in which the portion of the contour of the compressor which extends over the rounded over part of the seating extends only at the sides and the compressor is subdivided into fingers extending from a central part which engages the diaphragm on the inside of the nove.

7. A fluid controlling valve according to claim 1 in which the compressor is pivoted to the operating mechanism on an axis parallel to the valve bore.

8. A fluid controlling valve according to claim 1 in which the surface by which the diaphragm is pressed against the valve casing is provided on a bonnet which is itself held to the casing by a ring nut.

9. A fluid controlling valve according to claim 8 in which the member which bounds the peripheral edge of the diaphragm is bounded by a cylindrical inner wall of a threaded part of the casing on to which the ring nut screws.

References Cited

UNITED STATES PATENTS

| | | | |
|---|---|---|---|
| Re. 24,350 | 8/1957 | Price et al. | 251—331 XR |
| 2,892,613 | 6/1959 | Boteler | 251—331 |
| 2,936,998 | 5/1960 | Loepsinger | 251—331 |
| 2,988,322 | 6/1961 | Anderson | 251—331 |
| 3,020,020 | 2/1962 | Boteler | 251—331 |
| 3,103,342 | 9/1963 | Boteler | 251—331 |
| 3,157,383 | 11/1964 | Price | 251—331 |
| 3,250,511 | 5/1966 | Priese | 251—331 |
| 3,310,279 | 3/1967 | Boteler | 251—331 |
| 3,310,382 | 3/1967 | Boteler | 251—331 |

FOREIGN PATENTS

| | | |
|---|---|---|
| 159,484 | 10/1954 | Australia. |
| 562,078 | 11/1957 | Belgium. |
| 732,201 | 6/1955 | Great Britain. |

SAMUEL SCOTT, Primary Examiner.